United States Patent [19]

Mizutani et al.

[11] Patent Number: 4,881,696
[45] Date of Patent: Nov. 21, 1989

[54] MECHANISM FOR PREVENTING LOOSENING OF TAPE IN A TAPE CARTRIDGE

[75] Inventors: Hikaru Mizutani, Osaka; Yoshimi Maehara, Kyoto, both of Japan

[73] Assignee: Hitachi Maxell, Ltd., Osaka, Japan

[21] Appl. No.: 139,159

[22] Filed: Dec. 21, 1987

Related U.S. Application Data

[63] Continuation of Ser. No. 825,551, Jan. 23, 1986, abandoned.

[30] Foreign Application Priority Data

Jan. 26, 1985 [JP] Japan .................................. 60-9779

[51] Int. Cl.⁴ ........................................... G11B 23/087
[52] U.S. Cl. .................................................. 242/199
[58] Field of Search ................. 242/197, 199; 360/132

[56] References Cited

U.S. PATENT DOCUMENTS

| | | | |
|---|---|---|---|
| 4,289,285 | 9/1981 | Ishida et al. | 242/199 |
| 4,290,567 | 9/1981 | Saito | 242/198 |
| 4,342,436 | 8/1982 | Oyama et al. | 242/199 |
| 4,417,704 | 11/1983 | Oishi et al. | 242/199 X |
| 4,463,918 | 8/1984 | Takagi | 242/199 |
| 4,541,588 | 9/1985 | Sato | 242/199 |
| 4,569,492 | 2/1986 | Gelardi et al. | 242/199 |

Primary Examiner—David Werner
Attorney, Agent, or Firm—Birch, Stewart, Kolasch & Birch

[57] ABSTRACT

A tape cartridge which comprises a tape loosening preventing means disposed at a tape guide pin in the cartridge. A slidable member may be supported resiliently on said tape loosening preventing means so as to apply a force to the tape from the inner surface in an outward direction to stretch the tape.

9 Claims, 5 Drawing Sheets ing 4,881,696

MECHANISM FOR PREVENTING LOOSENING OF TAPE IN A TAPE CARTRIDGE

This application is a continuation of application Ser. No. 825,551, filed on Jan. 23, 1986, now abandoned.

BACKGROUND OF THE INVENTION

1. Field of the Invention

The present invention relates to a tape cartridge and more particularly to a tape cartridge having a mechanism for preventing a recording tape from becoming loose in the cartridge case.

2. Description of the Related Art

In a magnetic recording tape cartridge, a typical mechanism for preventing the loosening of the recording tape has been disclosed in the Japanese utility model publication 56389/1983. The mechanism is shown in FIG. 1 wherein a recording tape 2 is drawn from a tape reel 3 contained in a case body, 1 guided by a guide pin 35 and a tape guide 9. A resilient sheet 31 is supported in a fixed manner as a canti lever by fixing one end 31a, of the sheet 31 with the free end 31b being resiliently pressed onto the cylindrical surface of the guide pin 35, clamping the recording tape 2 therebetween, whereby the recording tape can be prevented from becoming loosened from the tape reel 3 and thus the recording tape is prevented from coming out of the front part of the case body 1. The above mentioned arrangement is broadly adopted in the so called VHS type video tape cartridges.

On the other hand, a typical small sized video tape cartridge, such as a 8 mm video tape cartridge, as shown in FIGS. 2 and 3, has been well known. In this cartridge, the case body is provided with a rotatable front lid 10 and an inner cover lid 21 at the front part of the case body 1. When the cartridge is not in use, the front lid 10 is placed in a closed position so as to cover the outer face of the recording tape 2 extending along the front part of the case body 1. Also, the inner cover plate 21 covers the inner face of the recording tape 2 over that part of an opening of a pocket 19 defined in the front bottom portion of the case body 1. When the cartridge is mounted in a tape player, the front lid 10 is rotated upward as in the inner cover lid 21 so as to open the front part of the case body 1. An arrangement of this type is disclosed in Japanese patent laid open 213072/1984 and Japanese utility model laid open 185779/1984.

The arrangement of the prior art tape cartridge as shown in FIG. 1 is made based on the art of depressing the recording tape 2 onto the guide pin 35 by the resilient sheet 31 at the position between the tape reel 3 and the tape guide 9. Accordingly, there must be provided the guide pin 35, which causes the structure of the cartridge, particularly the tape path, to be relatively complicated.

In the tape cartridge having the front lid 10 with the inner cover lid 21, such as a 8 mm tape cartridge, it is also essentially necessary to prevent the loosening of the recording tape. Namely, if the recording tape is loosened toward the inside of the case body at the front portion thereof, either the front lid 10 or the inner cover lid 21 may erroneously engage with the top edge of the recording tape during the movement of the lids 10 and 21 from the open position to the closed position. As a result, the recording tape is damaged or the lids 10 and 21 are undesirably stopped half way, whereby the tape cartridge is prevented from being removed from the tape player. Particularly in such a tape player wherein the tape cartridge is mounted with the front thereof directed downward or the vertical mounting type, if there is any space to allow loosening of the recording tape, the recording tape tends to become loosened and hang downward outside the case body. The conventional 8 mm tape cartridge is not provided with a mechanism for preventing loosening of the recording tape because of lack of space in the case body for a tape loosening preventing mechanism in such a small size tape cartridge.

SUMMARY OF THE INVENTION

An essential object of the present invention is to provide a tape cartridge which is capable of effectively preventing the tape of a tape cartridge from becoming loosened in the cartridge with a simple arrangement.

Another object of the present invention is to provide a recording tape cartridge having a mechanism for preventing loosening of the recording tape which can be used even in a small sized tape cartridge such as a 8 mm tape cartridge.

According to the present invention, there is provided a tape cartridge comprising a case body having openings defined at the front portion of the case body for drawing a tape therethrough which is wound on a pair of tape reels, a pair of tape guides standing on both lateral side portions in the front portion of the case body for guiding the tape along a predetermined path in the front portion of the case body and at least one tape loosening preventing means disposed near at least one of the tape guides for slidably and resiliently contacting the inner surface of the tape juxtapositioned near the tape guides positioned between the tape reel and respective tape guide so as to apply a force in an outward direction so that the tape is prevented from being loosened.

According to the present invention, since the tape loosening preventing means per se can apply force to the tape from the inner surface thereof outward in a position between the tape reel and the tape guide, so that even if there is a possible play of rotation of the tape reels which are braked when the tape cartridge is not in use, the tape in the front portion of the case body can be kept stretched tightly since the tape loosening preventing means pushes the tape in the outward direction an amount corresponding to the play, the tape can be kept stretched and prevented from being loosened. Since the tape loosening preventing means can be disposed near the tape guide, the tape can be effectively prevented from being stretched by a small amount of displacement of the tape loosening preventing means.

Also, since there is no need to provide an additional pin, such as the pin 35 shown in FIG. 1, the construction of the tape loosening preventing means can be simple and the space required for the mechanism for preventing tape loosening can be decreased.

DETAILED DESCRIPTION OF THE PREFERRED EMBODIMENTS

Figure 1:
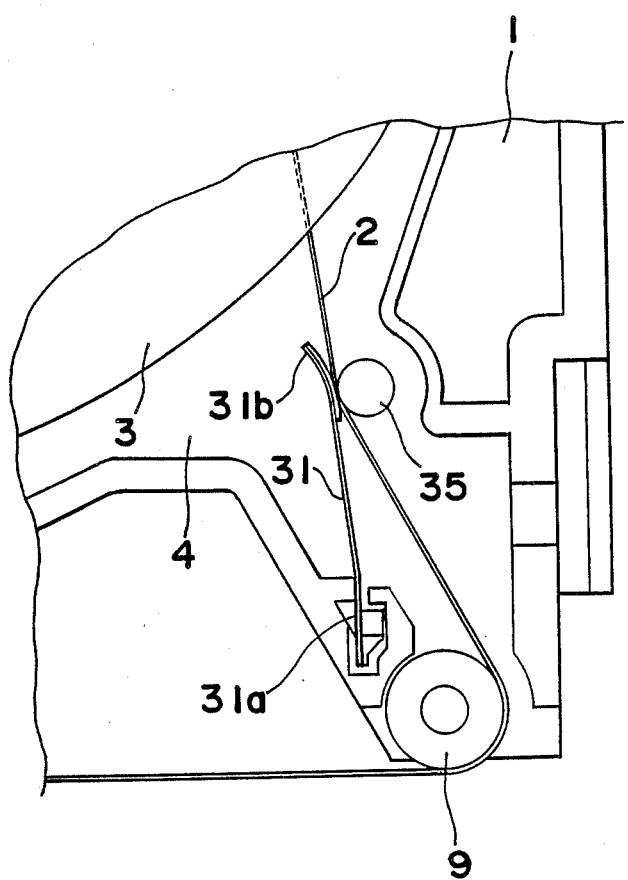
FIG. 1 is a partial top plan view of a tape loosening preventing mechanism used in a conventional recording tape cartridge.

Before the description proceeds, it is noted that like parts are designated by like reference numerals throughout the drawings. Also it is noted that a small sized tape cartridge referred to as a 8 mm tape cartridge, is shown as the preferred embodiment of the present invention.

Figure 2:
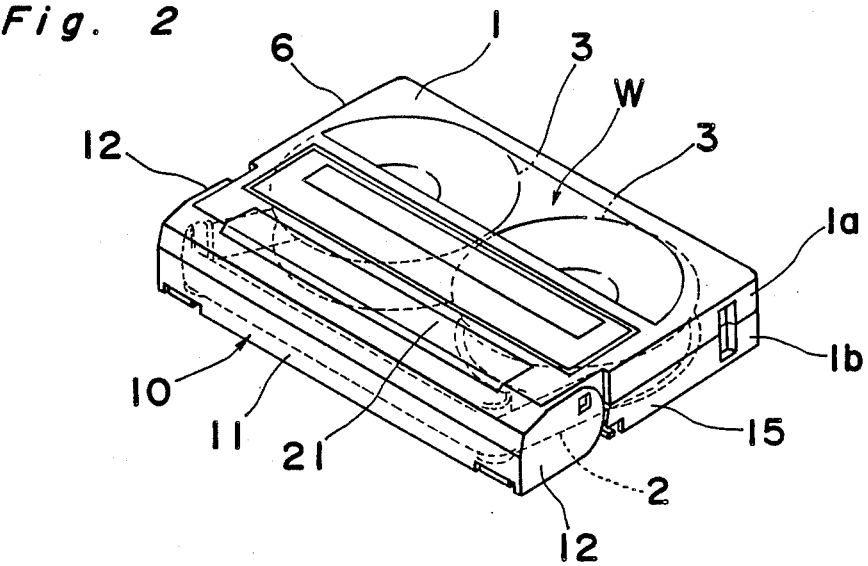
FIG. 2 is a perspective view of a tape cartridge in which the tape loosening preventing mechanism of the present invention is employed.
Figure 3:
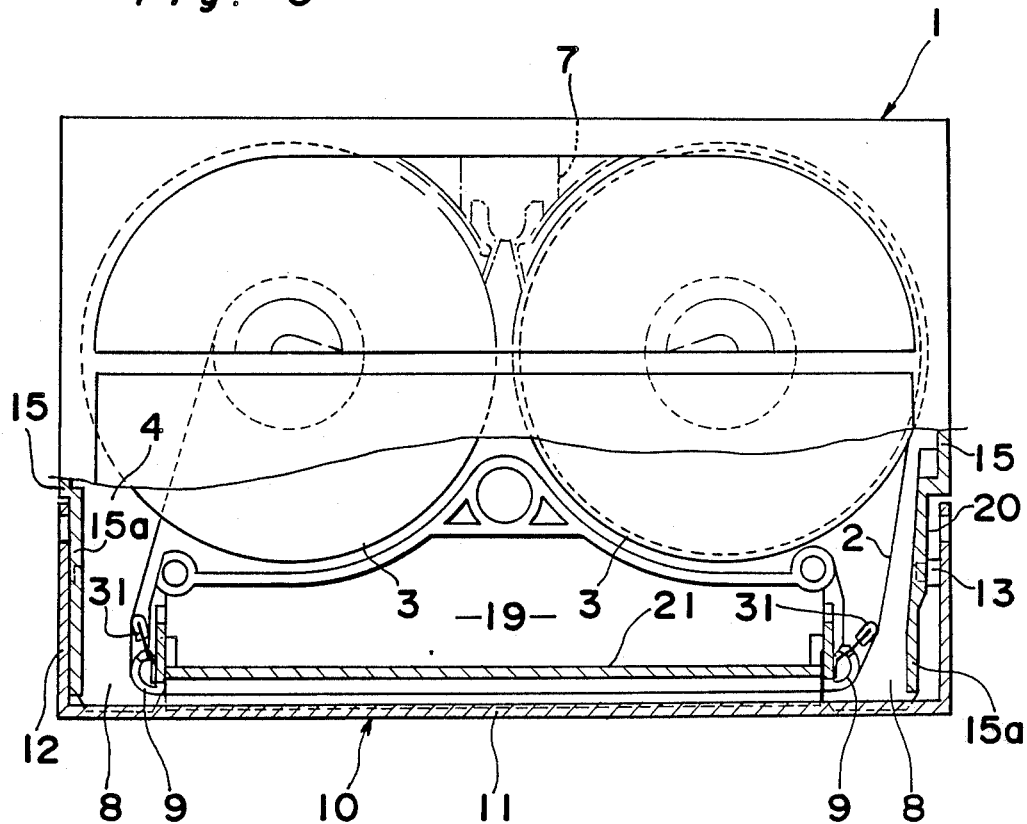
FIG. 3 is a top plan view of the tape cartridge shown in FIG. 2 with the top case half partially broken.

Referring to FIG. 2, the case body 1 of a 8 mm tape cartridge is formed by assembling a top half 1a and bottom half 1b by screws in a butting manner. The top half 1a and bottom half 1b are made of plastic resin materials. The case body 1 contains a pair of tape reels 3 rotatably mounted juxtaposed to each other for winding the recording tape 2. The tape reels 3 are pivotally mounted facing a pair of drive shaft insertion holes defined on the bottom half 1b. There is defined a transparent window W on the top wall 6 of the top half 1a so as to monitor the amount of the roll recording tape 2 wound on the tape reels 3. A brake mechanism 7 is disposed in the rear half part of the case body 1 so as to prevent rotation of the tape reels 3 by the engagement between the brake and the tape reels when the tape cartridge is not in use. When the tape cartridge is mounted on the tape player, the brake mechanism 7 is released to allow free rotation of the tape reels 3.

A pair of tape guide members 9 standing vertically on the bottom half 1b are disposed at positions inward of tape drawing openings 8 defined near both side corners of the front portion of the bottom case 1. Each of the tape guide members 9 has a semi-cylindrical surface facing to the respective tape drawing opening 8. The recording tape 2 released from one tape reel 3, is taken up by another tape reel after passing over the semi-cylindrical surfaces of the tape guide members 9.

The front lid 10, with the inner cover lid 21, is rotatably mounted on the front part of the case body 1 for protecting the recording tape 2.

Figure 4:
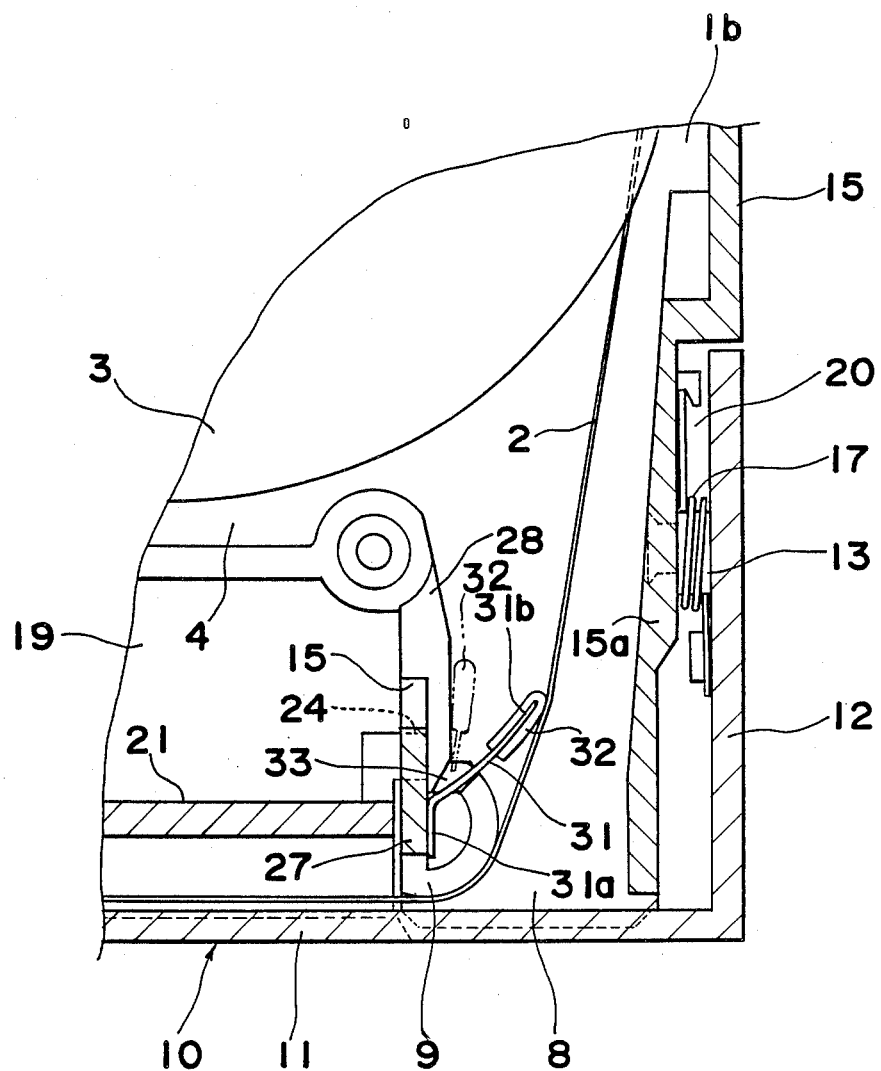
FIG. 4 is a partial top view plan view showing an essential part of the tape loosening preventing mechanism according to the present invention.

The front lid 10 comprises a straight front plate 11 for closing the front part of the case body 1, a pair of connecting arms 12 projected backward from both side ends of the front plate 11 and supporting shaft 13 projected inward front the inner face of at least one of connecting arms 12. The connecting arms 12 are rotatably fitted with the recessed stepped parts 15a of both side walls 15 of the case body 1 with the supporting shaft 13 fitted in a hole (not shown) defined in at least one of the stepped parts 15a. The front lid 10 can be moved between the position closing the front part of the case body 1 and the opened position. The front lid 10 is normally forced toward the closed position by a force of a torsion spring 17 mounted on the right supporting shaft 13, as shown in FIG. 4.

Figure 5:
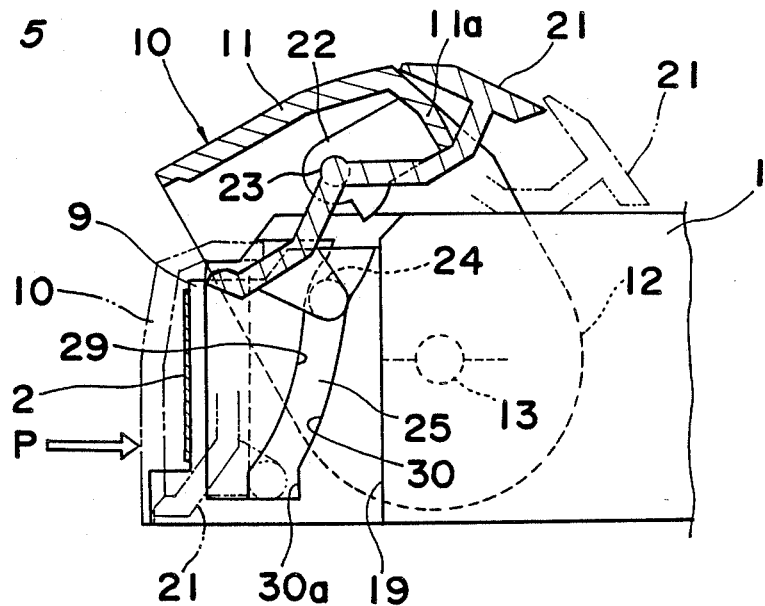
FIG. 5 is a partial cross sectional side view of the front portion of the tape cartridge shown in FIG. 3.

When the tape cartridge is not in use, the front lid 10 is in the closed position, as shown by the phantom lines in FIG. 5, to protect the outer front surface of the recording tape 2. When the tape cartridge is mounted on the tape player, the front lid 10 is opened, as shown in FIG. 5, allowing the drawing of the recording tape from the front of the case body 1 by a tape loading pin (not shown) entered in the opening of a pocket 19 defined in the front bottom portion of the bottom half 1b of the case body 1.

A lid locking mechanism (not shown) may be provided in the gap between the stepped part 15a of the side wall of the case body 1 and the right connecting arm 12 along with the torsion spring 17 mentioned above.

The inner cover lid 21, made of plastic resin material is movably coupled to the inner side of the front lid 10 in the area corresponding to the pocket 19. When the tape cartridge is not in use, the inner cover lid 21 serves to cover either the opening of the pocket 19 from above or the opposite inner surface of the recording tape 2, including the lower edge portion thereof, so as to prevent dust from collecting on to the recording tape from below through the pocket 19, thereby protecting the recording tape from dust.

As shown in FIG. 5, a pair of lid mounting plates 22 project in a vertical downward direction from both side end portions of the top plate 11a of the front lid 10. The inner cover lid 21 is rotatably mounted on the front lid 10 by fitting pivotal shafts 23, projected from both sides of the inner cover lid 21 at an intermediate position between the top and bottom of the inner cover lid 21, with the lid mounting plates 22. A pair of sliding projections 24 are projected from both side ends of the inner cover lid 21 at the bottom portion thereof. The projections 24 are slidably engaged in guide grooves 25 defined on the walls of the case body 1 facing to the pocket 19 in the form of a S character. In the arrangement mentioned above, the inner cover lid 21 can be moved with the movement of the front lid 10 controlled by the movement of the sliding projections 24 acting as a cam follower guided in the guide grooves, whereby the inner cover lid is moved without interfering with the recording tape.

In the preferred embodiment, each of the grooves 25 is formed in a manner described below.

Figure 6:
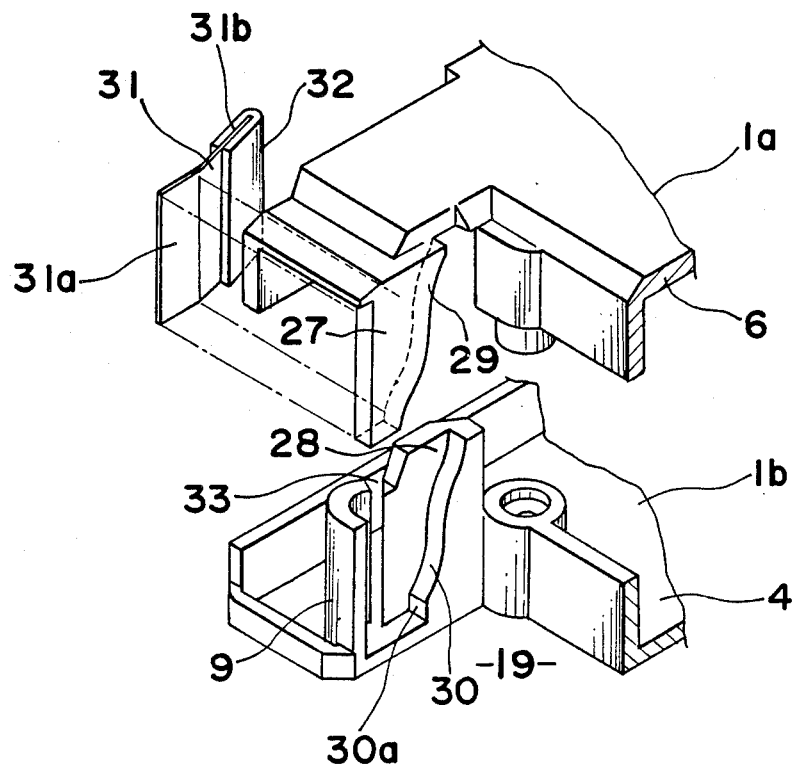
FIG. 6 is an exploded view showing an essential part of the tape cartridge shown in FIG. 3.

As shown in FIG. 6 each side wall defining the side of the pocket 19 is formed by combining a wall 27 vertically suspended from the front edge of the top wall 6 of the top half 1a (the wall 27 is referred to as suspended wall) with a curved guide surface 29 and a wall 28 vertically standing on the bottom wall 4 of the bottom half 1b (the wall 28 is referred to as standing wall) rearward of the tape guide 9 with a curved guide surface 30 formed by a stepped shoulder. In this arrangement, when the top half 1a and the bottom half 1b are combined together to form the case body 1, both suspended wall 27 and standing wall 28 are combined to form the side wall of the pocket 19. By this combination, the groove 25 is formed by a gap defined by the curved guide surfaces 29 and 30 opposing each other with the width slightly greater than the diameter of the support shaft 24.

There is also formed a vertical straight wall 30a in the bottom portion of the curved guide surface 30 of the standing wall 28, so that when the front lid 10 and the inner cover plate 21 are in the closed position, even if the front lid 10 is pushed in the direction P (FIG. 5)

from the front the support shaft 24 is engaged with the vertical straight wall 30a for preventing the inner cover lid 21 from being moved upward.

First Embodiment of the Tape Loosening Preventing Mechanism

Referring to FIGS. 3 to 6, there are shown a pair of tape loosening preventing members 31 near both tape guides 9.

The tape loose preventing member 31 is made of a plastic resin material such as a polyethylene resin having a strong resiliency. The base portion 31a of the tape loosening preventing members 31 is bent in an L character shape, and the free end 31b is fitted with a slidable member 32 made of, for example tetrafluorethylene sheet. In place of forming the tape loosening preventing members 31 and the slidable member 32, the tape loosening preventing members may be made of one integrated body made of a polyethylene terephthalate sheet or a sheet made of a mixture of polyethylene terephthalate or polybutylene terephthalate, an electrical conductive material, such as carbon black, and suitable lubricant.

The base portion 31a of the loosening tape preventing members 31 is bonded in a fixed manner to the surface of the suspended wall 27 facing the interior of the case body 1, with the slidable member 32 swingably projecting, therefrom the top half 1a being assembled with the bottom half 1b, the intermediate portion of the tape loose preventing members 31 is swingably inserted in a space 33 defined by the tape guide 9 and the standing wall, as clearly shown in FIG. 4, so that the slidable member 32 projects into the interior of the case body 1, generally toward the tape reel 3, for depressing the recording tape outward from the reverse surface of the recording tape near the tape guide 9.

In operation, the recording tape 2 advances from one of the tape reel to the other tape reel slidably contacting the slidable members 32 by which the recording tape 2 is kept stretched due to the resilient force exerted in the outward direction by the slidable member 32. As the roll of the recording tape on the tape reel is increased, the tape loosening preventing members 31 shifts from the position shown by the phantom line toward the position shown by the real line. The position of the tape loosening preventing members 31 shown by the phantom line corresponds to the minimum roll of the recording tape and the position shown by the real lines to the maximum roll. In any case, the tape loosening preventing members 31 pushes the recording tape 2 in the lateral and outward direction, with the small amount of the displacement of the tape loosening preventing members 31. It is appreciated that since the slidable member 32 does not contact with the recording surface or the magnetic surface of the recording tape, but contacts the reverse surface, the magnetic surface is not harmed.

It is further appreciated that since the tape loosening preventing member 31 can be installed in a small space near the tape guide and the base portion 31a of the tape loosening preventing member 31 is secured to the top half 1a, mounting of the tape loosening preventing member 31 is made easy, and, in addition, the tape loosening preventing member 31 can be made in a reduced size. Moreover, it is appreciated that the force applied to the recording tape by the tape loosening preventing member 31 is slightly changed even if the tape path is changed, whereby the recording tape is subjected to a substantially constant stretching force.

As mentioned above, there are many advantages to securing the base portion 31a to the suspended wall 27 of the top half 1a. However, in case the suspended wall 27 is not provided in the top half 1a, because the guide groove 25 is formed in the suitable wall of the bottom half, the base portion 31a of the tape loosening preventing member 31 may be secured to a possible member formed in the top half 1a.

Second Embodiment of the Tape Loosening Preventing Mechanism

Figure 7:
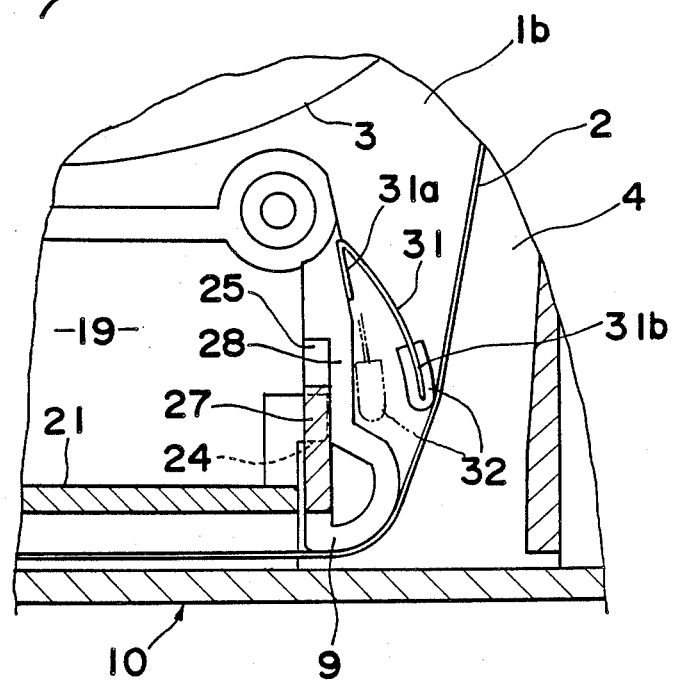
FIG. 7 is a partial top plan view of a second embodiment of the tape cartridge according to the present invention.

Referring to FIG. 7, the tape loosening preventing member 31 has its base portion 31a bent in the form of a V character and fixed to the surface of the standing wall 28 of the bottom half 1b so that the slidable member 32 is positioned near the tape guide 9. The function of the tape loosening preventing member 31, shown in the second embodiment, is similar to that of the first embodiment mentioned above.

Third Embodiment of the Tape Loosening Preventing Mechanism

Figure 8:
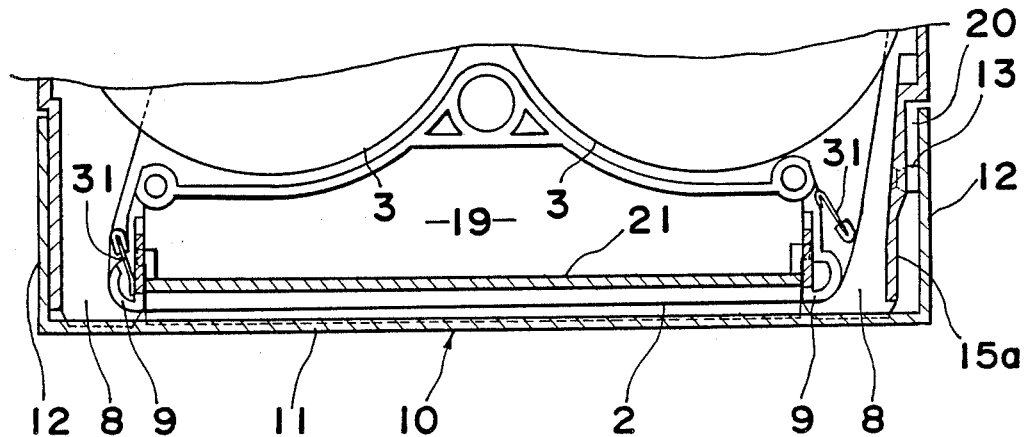
FIG. 8 is a partial top plan view showing a third embodiment of the tape cartridge according to the present invention.

Referring to FIG. 8, the tape loosening preventing member 31 on the left hand side in the drawing is arranged in the manner shown in the first embodiment and another tape loosening preventing member 31 on the right hand side is arranged in the manner shown in the second embodiment. In this embodiment, in case the recording tape is taken up from the right tape reel to the left tape reel, both of the tape loose preventing members 31 do not oppose the advance of the recording tape but assure the desired stretching of the recording tape.

Although the tape loosening preventing members 31 are explained with reference to the preferred embodiment, the way of securing the tape loosening preventing member 31 may be changed in various ways, for example, the base portion of the tape loosening preventing members 31 may be secured to the top half or bottom half in the form of an insertion. Also the tape cartridge per se is not limited to the type having a front lid. Moreover, the tape guide may be in the form of a guide roller.

It is appreciated that one advantage of the present invention is in that the tape loosening preventing member can be installed in a small space since there is not used an additional guide pin (35) as used in the prior art, so that the present invention enables the adoption of the tape loosening preventing member in a small size tape cartridge.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A tape cartridge consisting of a case body including a top half and a bottom half, a pair of tape reels having a tape wound thereon, an opening defined at a front portion of said case body for drawing said tape therethrough by a front lid in a closed positon and an inner cover lid movably coupled to said front lid, vertical suspended walls from said top half and vertical standing walls projecting from said bottom half on either side of said inner cover lid such that when said top half and bottom half are combined together to form said case body said suspended walls combine with said standing walls to form side walls lateral to said inner cover, a pair of tape guides provided at each lateral side of said front portion of said case body in front of said vertical standing walls for guiding said tape along a predetermined path through said front portion opening of said case body and at least one pressure means for preventing loosening of said tape comprising a base portion and a free end portion, said at least one pressure means for preventing loosening of said tape being juxtapositioned to a corresponding one of said tape guides between said respective tape guide and corresponding tape reel for slidably and resiliently contacting an inner or back surface of said tape immediately before or after said tape passes over said corresponding tape guide such that said at least one pressure means maintains a constant force in an outward direction against said tape due to the flexible nature of said pressure means thereby preventing loosening of said tape as the amount of tape on said tape reels changes while eliminating the need for a tape guide pin.

2. The tape cartridge according to claim 1, wherein said pressure means for preventing loosening of said tape comprises a polyethylene base portion having a slidable member on a free end portion thereof which contacts said inner surface of said tape.

3. The tape cartridge according to claim 2, wherein said slidable member comprises tetrafluorethylene.

4. The tape cartridge according to claim 1, wherein said pressure means for preventing loosening of said tape comprises an integral body of polyethylene terephthalate containing carbon black and a lubricant.

5. The tape cartridge according to claim 1, wherein said pressure means for preventing loosening of said tape comprises an integral body of polybutylene terephthalate containing carbon black and a lubricant.

6. The tape cartridge of claim 1, wherein said at least one pressure means is bent in a general L-shape, the base portion thereof being bonded to said suspended wall portion of said side wall and the free end portion being swingably projected rearward into a space defined by said corresponding tape guide and standing wall to contact said inner or back surface of said tape.

7. The tape cartridge of claim 6, comprising a pair of said pressure means for preventing loosening of said tape, one pressure means being provided before a first tape guide positioned on one side of said front portion of said case body and one pressure means being provided after a second tape guide positioned on a second side of said front portion of said case body.

8. The tape cartridge of claim 1, wherein said at least one pressure means is bent in a general V-shape, the base portion thereof being fixed to said vertical standing wall portion of said side wall and the free end portion swingably projects forward to contact said inner or back surface of said tape.

9. The tape cartridge of claim 8, comprising a pair of said pressure means for preventing loosening of said tape, one pressure means being provided before a first tape guide positioned on one side of said front portion of said case body and one pressure means being provided after a second tape guide positioned on a second side of said front portion of said case body.

* * * * *